United States Patent [19]

Nathan

[11] 4,170,134

[45] Oct. 9, 1979

[54] FLUID-FLOW PRESSURE-SENSING DEVICE

[76] Inventor: Matthew L. Nathan, 10 Sterling St., London SW7 1HN, England

[21] Appl. No.: 852,701

[22] Filed: Nov. 18, 1977

[30] Foreign Application Priority Data

Nov. 26, 1976 [GB] United Kingdom ............... 49413/76

[51] Int. Cl.$^2$ .............................................. G01F 1/46
[52] U.S. Cl. ......................................... 73/212; 73/182
[58] Field of Search ....................... 73/212, 182, 205 R

[56] References Cited

U.S. PATENT DOCUMENTS

| | | | |
|---|---|---|---|
| 2,706,408 | 4/1955 | Holbrook | 73/212 |
| 3,449,954 | 6/1969 | Brown | 73/212 |

FOREIGN PATENT DOCUMENTS 21122 6/1882 Fed. Rep. of Germany ............. 73/212

Primary Examiner—Donald O. Woodiel
Attorney, Agent, or Firm—Shapiro and Shapiro

[57] ABSTRACT

A fluid-flow pressure-sensing device provided with a conduit extending into a fluid flow-carrying duct. The end of the conduit in the duct has a baffle bent to provide two surfaces meeting at an edge. The device is positioned in the conduit so that one of the surfaces faces upstream, the other surface extending downstream of the direction of fluid flow. The conduit projects through the other surface of the baffle and has an opening into the vena contracta produced in use in the fluid by the first surface.

10 Claims, 5 Drawing Figures

FLUID-FLOW PRESSURE-SENSING DEVICE

BACKGROUND OF THE INVENTION

This invention relates to a fluid flow pressure-sensing device.

SUMMARY OF THE INVENTION

As seen from one aspect of the invention, there is provided a fluid flow pressure-sensing device comprising a conduit extending into a fluid flow-carrying duct, pipe or channel from a wall thereof and a baffle near the inner end of the conduit, the baffle having two surfaces meeting at an angle to each other at an edge, a first one of said two surfaces being upstream of the conduit and facing upstream, the second surface extending downstream from said edge, the conduit projecting through the second surface close to said edge and having an opening into a vena contracta produced (in use) in the fluid by the first surface.

BRIEF DESCRIPTION OF THE DRAWINGS

The invention will be described by way of example with reference to the accompanying drawings wherein.

DETAILED DESCRIPTION OF PREFERRED EMBODIMENTS

Figure 1:
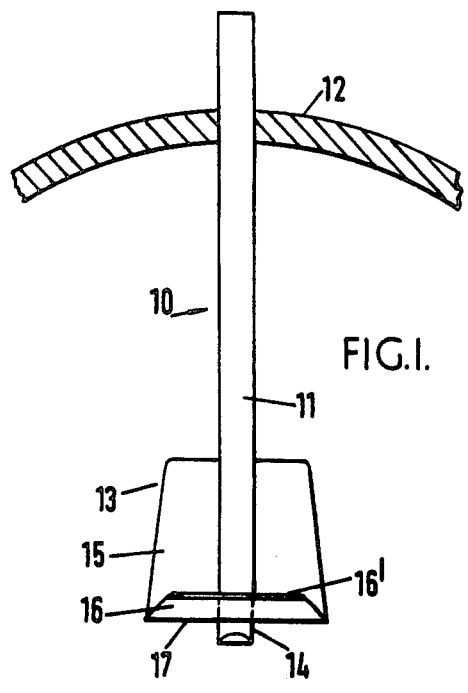
FIG. 1 illustrates a fluid flow pressure-sensing device in accordance with the invention, looking in the upstream direction.
Figure 3:
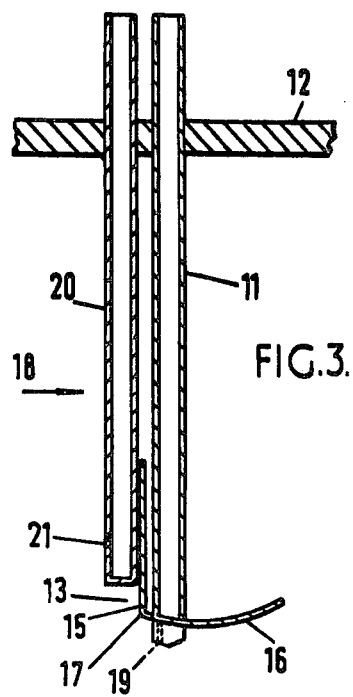
FIG. 3 illustrates the device of FIGS. 1 and 2 looking sideways.
Figure 4:
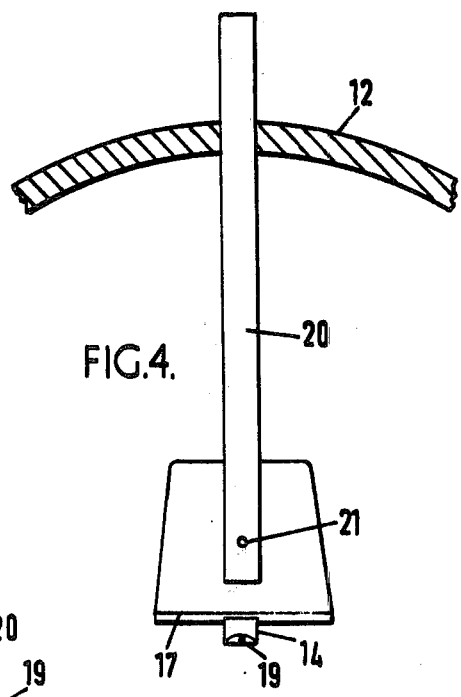
FIG. 4 illustrates another embodiment of the invention.
Figure 5:
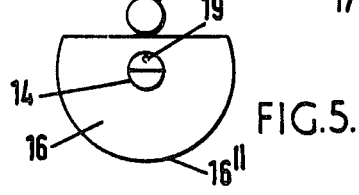
FIG. 5 is a plan view of FIG. 4.

Referring to the drawings, the illustrated fluid flow pressure-sensing device 10 comprises a first conduit 11 extending into a fluid flow-carrying duct, pipe or channel from a wall 12 thereof and a baffle 13 near the inner end 14 of the conduit 11. The baffle 13 has two surfaces 15 and 16 meeting at an angle to each other at an edge 17. That part of the baffle 13 bent over to form the surface 16 may have a straight terminating edge 16' as shown in FIG. 1. However, that part of the baffle 13 may have a curved circumferential edge 16" as shown in FIG. 4 and FIG. 5. The first surface 15 is upstream of the conduit 11 and faces upstream, that is to say, it faces towards the left in FIG. 3, assuming the fluid flow in FIG. 3 to be rightwards, as indicated by arrow 18. The second surface 16 extends downstream from the edge 17. The conduit 11 projects through the second surface 16 close to the edge 17 and has an opening 19 into a vena contracta (not shown) which is produced (in use) in the fluid by the first surface 15.

A second conduit 20 extends into the duct, pipe or channel to terminate a distance above the edge 17, which distance is preferably about equal to the diameter of the conduit 20. The second conduit 20 has an upstream-facing opening 21. The first conduit 11 is directly behind the second conduit 20. The opening 21 of the second conduit 20 is immediately in front of the middle of the first surface 15 of the baffle 13. The maximum width of the surface 15 as seen in either of FIGS. 1 and 2 (parallel to the edge 17) is of the order of one quarter the diameter of the duct, pipe or channel, which is of circular cross section.

The angle at which the surfaces 15 and 16 meet is approximately a right angle. The majority of surface 15 is perpendicular to the direction of fluid flow 18, whilst the surface 16 is somewhat curved as shown in FIG. 3. The baffle 13 is fixedly mounted on the conduit 11 and the position of conduit 11 together with the position of the baffle 13 is adjustable by adjusting the extent to which the conduit 11 extends into the duct, pipe or channel.

Because the opening 19 is into the vena contracta which is produced (in use) in the fluid by the first surface 15, the fluid pressure at the opening 19 is significantly lower than the pressure sensed by the opening 21, which faces upstream, so that a pressure differenceexists whereby the fluid flow can be measured by connection of a manometer or the like (not shown) between the conduits 11 and 20.

Figure 2:
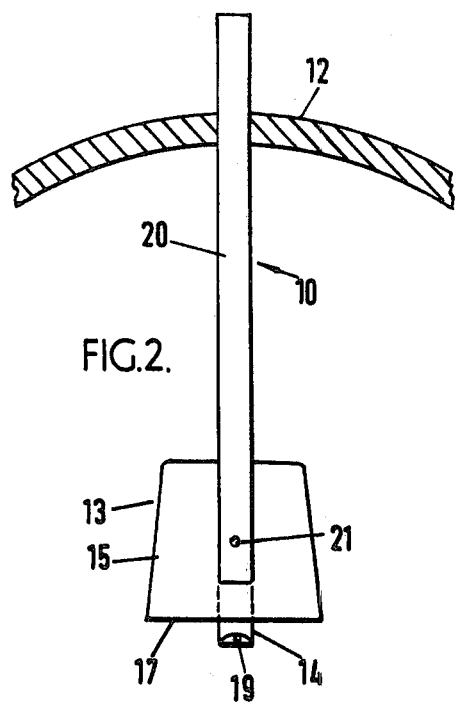
FIG. 2 illustrates the device of FIG. 1 looking in the downstream direction.

From the fact that the maximum width of the first surface 15 is of the order of one quarter the diameter of the duct, pipe or channel, it will be appreciated from a study of the drawings that the cross sectional area of the device as seen in FIGS. 1 and 2 is very much smaller than the total internal cross sectional area of the duct, pipe or channel, so that the pressure loss produced by the device is acceptably small. Furthermore, the conduits 11 and 20 can be partially moved downwardly through the wall 12 as seen in the drawings, so as to adjust the positions of the baffle 13 and the openings 19 and 21 in the duct, pipe or channel, with the effect of adjusting the pressure difference across conduits 11 and 20 for a given fluid flow.

In order that the pressure difference should relate to the fluid flow in a predictable manner, it is preferred that the duct, pipe or channel should be straight for some considerable distance both upstream and downstream of the conduits 11 and 20 and the baffle 13, so that the fluid flow is reasonably laminar.

Instead of being of circular cross section, the duct, pipe or channel may be non-circular. The baffle 13 may be constructed of metal sheet or plastic.

Because of the small size of the baffle 13 relative to the size of the duct, pipe or channel, it is not difficult to modify the device so that the conduits 11 and 20 together with the baffle 13 can be withdrawn from the duct, pipe or channel.

The device 10 may be used for measuring wind speed. In this case it may be mounted on a support structure such as a tripod and positioned such that the opening 21 faces upstream of the wind direction. The device 10 may be freely mounted on the support, and provided with a vane to enable it to automatically adjust its operating position in dependence on wind variation.

It will be appreciated that the device 10 is very inexpensive to make, apart from the cost of the duct, pipe or channel itself.

I claim:

1. A fluid flow pressure-sensing device comprising a conduit extending into a fluid flow-carrying duct, pipe or channel from a wall thereof and a baffle near the inner end of the conduit, the baffle having two surfaces meeting at an angle to each other at an edge, a first one of said two surfaces being upstream of the conduit and facing upstream, the second surface extending downstream from said edge, the first surface constituting means for producing a vena contracta in the fluid, the conduit projecting through the second surface close to said edge and having an opening into said vena contracta.

2. A device as claimed in claim 1 wherein a second conduit extends into the duct, pipe or channel and has an upstream-facing opening.

3. A device as claimed in claim 2 wherein the first conduit is directly behind the second conduit.

4. A device as claimed in claim 2 wherein the opening of the second conduit is immediately in front of the middle of the said first surface of the baffle.

5. A device as claimed in claim 2 wherein each conduit is straight.

6. A device as claimed in claim 1 wherein the duct, pipe or channel is of circular cross-section and the maximum width of said first surface parallel to said edge is of the order of one quarter the diameter of said duct, pipe or channel.

7. A device as claimed in claim 1 wherein the angle at which the two surfaces meet is approximately a right angle.

8. A device as claimed in claim 1 wherein the baffle is fixedly mounted on the conduit.

9. A device as claimed in claim 8 wherein the position of the conduit together with the position of the baffle is adjustable.

10. A device for sensing pressure in a flowing fluid comprising a conduit extending into the fluid transversely to the fluid flow, and a baffle supported on the conduit near an end of the conduit in the flowing fluid, the baffle having two surfaces meeting at an angle to each other at an edge, a first one of said two surfaces being upstream of the conduit and facing upstream, the second surface extending downstream from said edge, the first surface constituting means for producing a vena contracta in the fluid, the conduit projecting through the second surface close to said edge and having an opening into said vena contracta.

* * * * *